United States Patent
Phipps (10) Patent No.: US 10,460,310 B2
(45) Date of Patent: Oct. 29, 2019

(54) MOBILE TRANSACTION DEVICE ENABLING DYNAMIC ELECTRONIC CHECKINS

(71) Applicant: PAYPAL, INC., San Jose, CA (US)

(72) Inventor: Meghan Elizabeth Phipps, Baltimore, MD (US)

(73) Assignee: PayPal, Inc., San Jose, CA (US)

(*) Notice: Subject to any disclaimer, the term of this patent is extended or adjusted under 35 U.S.C. 154(b) by 864 days.

(21) Appl. No.: 14/984,187

(22) Filed: Dec. 30, 2015

(65) Prior Publication Data
US 2017/0193491 A1 Jul. 6, 2017

(51) Int. Cl.
*G06Q 20/32* (2012.01)
*G06Q 30/06* (2012.01)
*H04L 29/08* (2006.01)
*H04W 4/029* (2018.01)
*H04W 4/02* (2018.01)
*H04W 4/021* (2018.01)
*H04W 4/21* (2018.01)
*H04W 4/80* (2018.01)

(52) U.S. Cl.
CPC ....... *G06Q 20/3224* (2013.01); *G06Q 20/322* (2013.01); *G06Q 30/06* (2013.01); *G06Q 30/0631* (2013.01); *H04L 67/18* (2013.01); *H04W 4/02* (2013.01); *H04W 4/021* (2013.01); *H04W 4/029* (2018.02); *H04W 4/21* (2018.02); *H04W 4/80* (2018.02)

(58) Field of Classification Search
CPC ... G06Q 20/12; G06Q 20/322; G06Q 30/0252
See application file for complete search history.

(56) References Cited

U.S. PATENT DOCUMENTS

2012/0246004 A1* 9/2012 Book ............... G06Q 30/02
705/14.58

* cited by examiner

*Primary Examiner* — Hao Fu
(74) *Attorney, Agent, or Firm* — Haynes and Boone LLP (57) ABSTRACT

A mobile transaction device may present nearby event or location related merchants to a user and allow the user to check in at the event or location. The mobile transaction device may then present merchants who are associated with the event or location to the user. Thus, the user may quickly find relevant merchants with whom the user wishes to conduct mobile transactions. For example, merchants associated with an event, such as merchants in a farmer's market, food trucks along the same street, or the like, may be grouped together into a merchant group associated with an event/location. A name/picture/icon of the event/location may be presented to the user on the mobile transaction app of the user device. Thus, the user may select the event/location to check in at the event or location. The merchants associated with the event or location may be quickly located for transactions.

20 Claims, 5 Drawing Sheets

MOBILE TRANSACTION DEVICE ENABLING DYNAMIC ELECTRONIC CHECKINS

BACKGROUND

Field of the Invention

The present invention generally relates to mobile transaction devices, and in particular, mobile transaction devices for implementing location or event check-in transactions.

Related Art

With the popularity of mobile devices, more users are using their mobile devices to make transactions, such as making payments for purchases made at retail stores. When using the mobile device to conduct a transaction, a long list of participating merchants or users may be presented to the user. It may become tedious for the user to search through the long list of merchants or users to select the intended merchant or user with whom the user wishes to conduct a mobile transaction. Thus, there is a need for a mobile transaction device or a system that presents relevant merchants to the user for mobile transactions.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a mobile transaction device is provided which may present nearby event or location related merchants to a user and allow the user to check in at the event or location. The mobile transaction device may then present merchants who are associated with the event or location to the user. Thus, the user may quickly find relevant merchants with whom the user wishes to conduct mobile transactions. For example, merchants associated with an event, such as merchants in a farmer's market, food trucks along the same street, or the like, may be grouped together into a merchant group associated with an event/location, where the group may be designated by one or more of the group members or a group administrator or designated by a service provider and be a sub-group of another group. A name/picture/icon of the event/location may be presented to the user on the mobile transaction app of the user device. Thus, the user may select the event/location to check in at the event or location. The merchants associated with the event or location may be quickly located for transactions.

In an embodiment, the events or locations may be displayed along with the list of nearby merchants. The events or locations may be displayed in a different format or with a different icon/symbol from the formats/icons/symbols of individual merchants. Thus, the event/location may be presented differently from the individual merchants. In some embodiments, the events/locations may be listed first before listing the other individual merchants.

In an embodiment, the system may provide an application or interface, such as a merchant mobile app, that allows merchants to establish an event or location with participating merchants. In particular, an event/location administrator may initiate and establish an event or location. The administrator may invite merchants to join or participate in the event or location. For example, a conference administrator may establish an event/location for the conference and may invite merchants/vendors participating in the conferment to join the event/location. The event/location may be published and discoverable by conference attendees who may check in at the event/location to implement transactions with participating merchants/vendors at the event. Thus, the system may allow merchants to form an ad hoc location/event group for mobile transactions with customers.

In an embodiment, the system may automatically determine location/event related merchants and may automatically establish a location/event and invite the related merchants to join the event location. In particular, based on transaction history, location history, communication history, event related news or information of merchants and customers, the system may automatically determine that certain merchants should be associated at an event or location at certain time. The location/event may be permanent or temporary or may be a recurring event. For example, the system may determine that a group of merchants congregate at a parking lot every Saturday morning based their location history and transaction history. The system may gather information from the Internet or from social network media sites that this gathering of merchants is for a farmer's market. Thus, the system may automatically establish an event/location for this group of merchants for every Saturday morning at the same parking lot and may invite the merchants to join this event/location. This allows customers at the farmer's market to quickly find and check in with the merchants at the farmer's market.

In an embodiment, the system may automatically determine a group of merchants based on the transaction history and/or location history of a user of the mobile transaction app. For example, the system may determine that the user frequently visits a certain group of merchants at a location during certain period of time and may automatically establish an event/location for the group of merchants for the convenience of the user. In some embodiments, the mobile transaction app may allow the user to establish an event/location. Thus, the user may establish a personalized or customized group of merchants.

Figure 1:
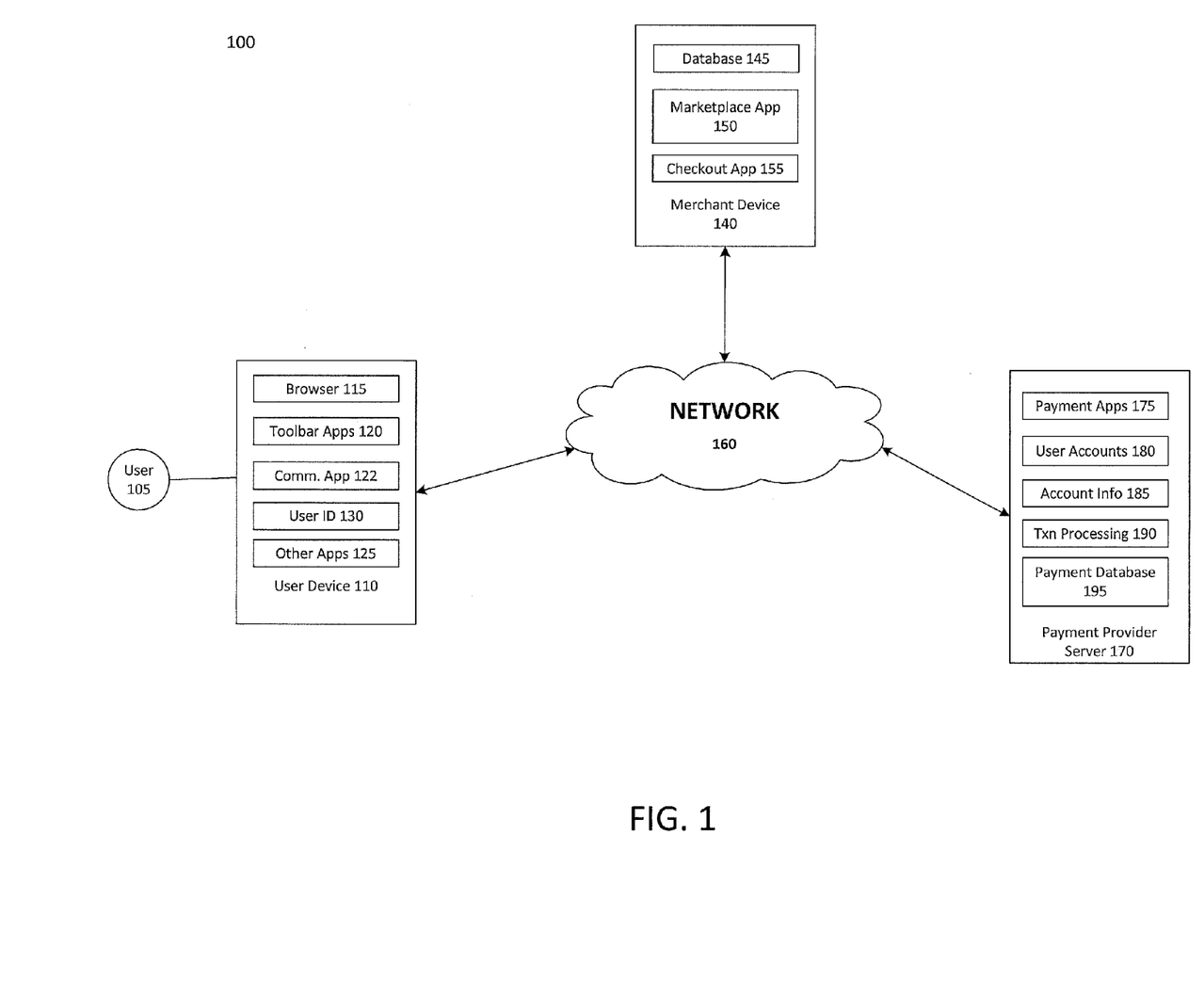
FIG. 1 is a block diagram of a networked system suitable for implementing location/event check-in for mobile transactions according to an embodiment.

FIG. 1 is a block diagram of a networked system 100 suitable for implementing in-store advertisement customization according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG.

1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant device 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to set up a group, receive information about a group, and/or make payments to one or more members of a group. Although only one merchant device is shown, a plurality of merchant devices may be utilized if the user is purchasing products or services from multiple merchants.

User device 110, merchant device 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a location detection device, such as GPS system and the like. Further, user device 110 may include a Bluetooth device configured to implement low energy Bluetooth (BLE) communication. For example, user device 110 may detect various low energy Bluetooth signals from Bluetooth beacons installed in a merchant's store. Thus, locations and movements of user device 110 may be determined by positioning techniques, such as triangulation or location fingerprinting.

Merchant device 140 may be maintained, for example, by a merchant or seller offering various products and/or services. The merchant may have a physical point-of-sale (POS) store front. The merchant may be a participating merchant who has a merchant account with the payment service provider. Merchant device 140 may be used for POS or online purchases and transactions. Generally, merchant device 140 may be maintained by anyone or any entity that receives money, which includes individuals as well as banks and retailers. Merchant device 140 may include a database 145 identifying available products (including digital goods) and/or services (e.g., collectively referred to as items) which may be made available for viewing and purchase by user 105. Accordingly, merchant device 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant device 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

In an embodiment, merchant device 140 may be a mobile device including a mobile merchant app that allows a merchant to receive and process payments from customers' mobile devices. For example, customers' mobile devices may connect to merchant device 140 via Bluetooth or Near-Field Communication (NFC) and which may facilitate communication for transactions between the a customer's mobile device (e.g., user device 110) and the merchant device 140. The mobile merchant app may further allow the merchant to establish, manage, and/or join one or more location/event based merchant groups.

The merchant device 140 may include similar functions/components as those of user device 110. For example, the merchant device 140 also may include a location detection device, such as GPS system and the like for detecting and/or tracking locations and movements of merchant device 110. The merchant device 140 also may include other applications for mobile communication and other mobile functions.

Payment provider server 170 may be maintained, for example, by an online payment service provider which may provide payment between user 105 and the operator of merchant device 140. In this regard, payment provider server 170 includes one or more payment applications 175 which may be configured to interact with user device 110 and/or merchant device 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant device 140 on behalf of user 105 during a transaction with checkout application 155 to track and manage purchases made by users and which and when funding sources are used.

In some embodiments, payment provider server 170 may maintain user history in the account information, such as user's browsing history, purchase history, communication history, and the like. In some embodiments, payment provider server 170 may have access to user's contact list, to-do list, calendar, and the like. Payment provider server 170 also may maintain merchant information, such as merchant's location history, transaction history, type of business, products/services offered, and the like. Payment provider server 170 may utilize the account information of users and/or merchants to automatically determine location/event based merchant groups. In an embodiment, payment provider server 170 may include a location/event based merchant group database storing various location/event based merchant groups. In some embodiments, a merchant may be included in various merchant groups at different time and/or location, especially for traveling merchants.

A transaction processing application 190, which may be part of payment application 175 or separate, may be configured to receive information from user device 110 and/or merchant device 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105 and merchants, as well as create new accounts if necessary.

Figure 2:
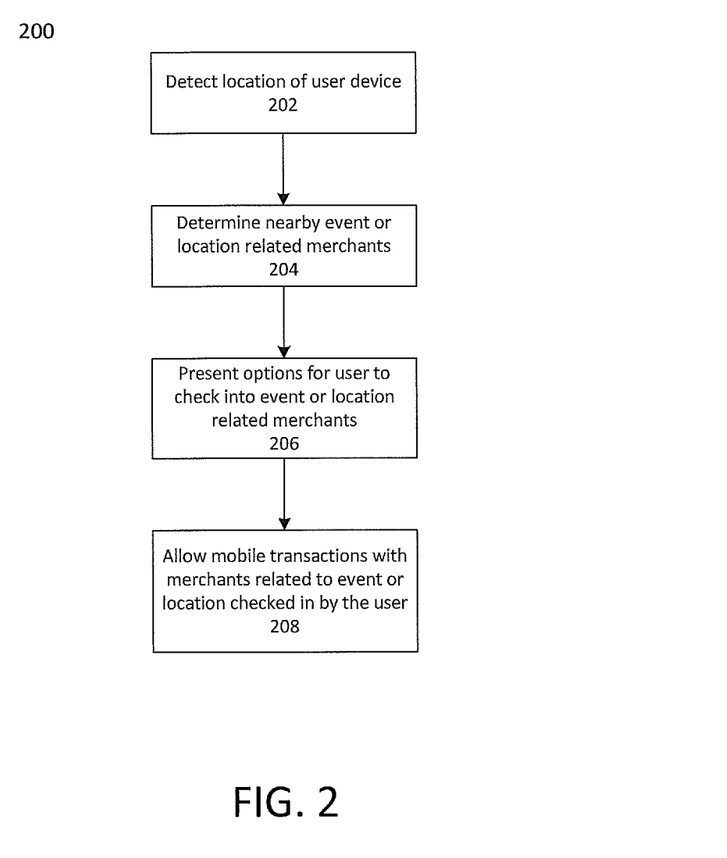
FIG. 2 is flowchart showing a location/event check-in process for mobile transactions according to one embodiment.

FIG. 2 is a flowchart showing a location/event check-in process 200 for mobile transactions according to one embodiment. At step 202, the location of the user device 110 may be detected. For example, the user 105 may activate or start a mobile transaction app on the user device 110. The mobile transaction app may begin to detect the location of the user device 110. The user device 110 may include a location detection device, such as a GPS device, that may detect GPS coordinates of the user device 110. In another example, the user device 110 may include a wireless device, such as a Bluetooth device, NFC device, or a WiFi device. The wireless device may be detect or be detected by a wireless beacon, such as a Bluetooth beacon, installed at certain locations. As such, location of the user device 110 may be detected or determined based on the detection. In some embodiments, the location of the user device 110 may be input by the user 105.

At step 204, the mobile transaction app may determine nearby merchants and/or nearby events/locations. In an embodiment, the user device 110 may communicate the location of the user device 110 to the payment provider server 170. The payment provider server 170 may use the current location of the user device 110 to query a merchant database of the payment provider server 170 for merchants located at or near the current location of the user device 110. The merchant database may include profiles of various merchants and/or merchant groups and their locations. For example, the payment provider server 170 may query the merchant database for merchants or merchant groups located within a one mile radius of the location of the user device 110. The user 105 may be allowed to input how wide the area of search should be, such as within 100 yards or within a five mile radius. The payment provider server 170 may communicate a list of merchants and/or merchant groups back to the user device 110. In some embodiments, the user device 110 may wirelessly detect nearby merchant devices and may determine the nearby merchants based on the identification of the detected, nearby merchant devices.

Figure 5A:
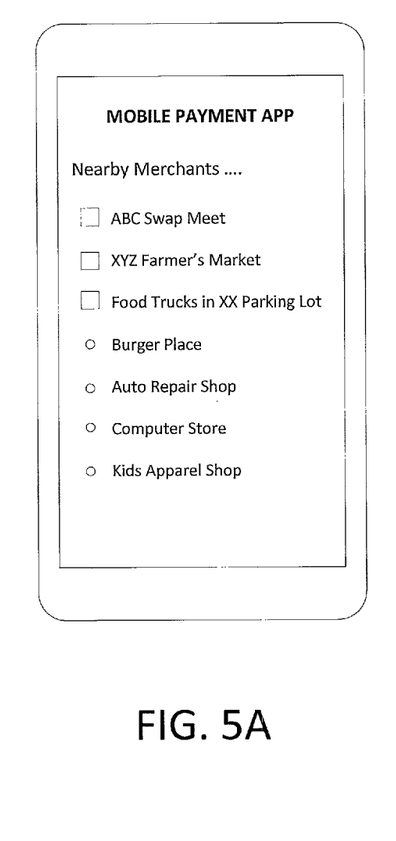
FIGS. 5A and 5B are screenshots of a mobile payment application implementing location/event check-in for mobile transactions according to an embodiment.

At step 206, the mobile transaction app at the user device 110 may present the list of nearby merchants or merchant groups to the user 105. In an embodiment, the process of querying and presenting nearby merchants may be automatically performed when the mobile transaction app is open or activated on the user device 110. For example, as shown in FIG. 5A, the mobile transaction app may present a list of merchants and merchant groups to the user 105. The merchant groups may be displayed with a different format, color, font, or icon from individual merchants. As shown in FIG. 5A, merchant groups, such as "ABC Swap Meet," "XYZ Farmer's Market," and "Food Trucks in XX Parking Lot" may have square icons and individual merchants, such as "Burger Place," "Auto Repair Shop," "Computer Store," and "Kids Apparel Shop" may have circle icons. Thus, the merchant groups may be displayed in a way that is distinguishable from individual merchants.

In an embodiment, the merchant groups may be displayed first in the list before the individual merchants. As such, the user 105 may see the merchant groups before seeing a long list of individual merchants. In an embodiment, the list of merchants may be prioritized by distance from the user 105, such that closer merchant groups are displayed first on the list. In an embodiment, the user 105 may be allowed to perform searches from the list of merchants. For example, the user 105 may enter one or more search words or may filter the list using different criteria, such as merchant type, product category, savings/discount availability, and the like. Thus, the user 105 may have various options for narrowing down a long list of merchant groups or individual merchants.

A merchant group may include a group merchants associated with a location or an event. For example, the ABC swap meet merchant group may include merchants who are attending and set up at the ABC swap meet. The Food Trucks in XX parking lot group may include food truck merchants who are congregating at the XX parking lot and may change as food truck merchants enter and exit the XX parking lot. The merchant groups may be formed or established based on an event, such as a swap meet or a farmer's market, or based on a location, such as food trucks at a parking lot. The merchant groups may be established by the merchants, the customers, a location/event administrator, or the payment service provider.

Figure 5B:
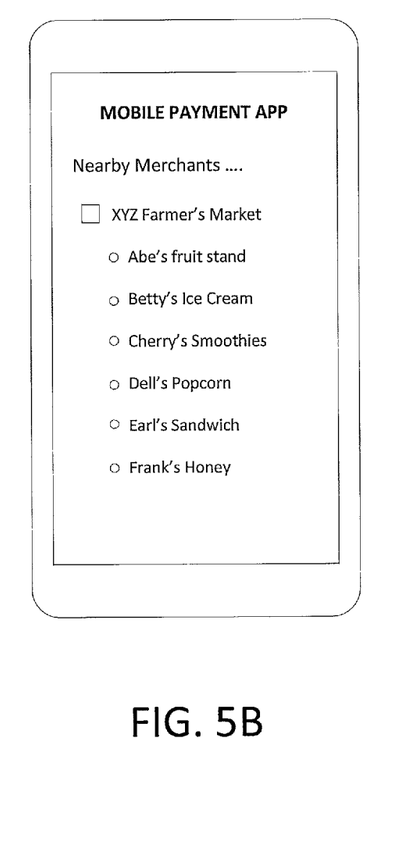

When a merchant group is selected, such as by user 105 tapping or clicking on the name or the icon of the merchant group, merchants associated with the merchant group may be displayed. As shown in FIG. 5B, when the merchant group XYZ Farmer's Market is selected, the individual merchants associated with XYZ Farmer's Market, such as Abe's fruit stand, Betty's ice cream, Cherry's smoothies, and the like, may be displayed on the user device 110. Thus, the user 105 may quickly locate individual merchants associated with a merchant group for making payments. The user may select one or more merchant groups or merchants from the list to check in. The check-in may then establish the user 105 at the merchant location. For example, account/transactional information of the merchants may be retrieved and loaded to the user device 110 ready for conducting transactions with the merchants. In another example, the check-in serves as a confirmation that the user 105 is physically located at or near the merchants or the checked-in location/event. Thus, the merchants associated with a location or event may be selected for making transactions with the user device 110 of the user 105.

In another embodiment, once a group is selected, the user is checked in to all members of the group. When members of the group leave (such as detected by the system through a merchant device), the user is checked out of the departed member, and when new members enter the group (such as detected by the system through a merchant device), the user is automatically checked in with the new member of the group. In this way, the user does not need to manually check in with all members of the group, and the system can determine when members should be checked out or checked in based on location determination within a geofence of the group or other obtained data.

At step 208, the user device 110 may be ready to make mobile transactions with the merchants who are associated with the location or event where the user 105 is checked in. The user 105 may be authenticated at the user device 110. For example, the user 105 may log into the user 105's account for making mobile transactions using a user ID and a password. In another example, the user 105 may be authenticated by a fingerprint scanner of the user device 110, by voice recognition, or by other methods of user authentication. The user device 110 may then be used to make payments at a merchant by interacting with the merchant's device (e.g., a Point-Of-Sale device) via Bluetooth communication or Near-Field Communication (NFC). For example, the user 105 may tap or bump the user device 110 on the merchant device 140 to make a payment to the merchant.

Accordingly, process 200 allows the user 105 to quickly check in to location/event related merchant groups, without having to review a long list of nearby merchants. After checking in to a location or an event, the user 105 may quickly locate the merchant associated with the location or event for conducting mobile transactions. Icons or names of location/event based merchant groups may be discoverable by the user device 110 and presented to the user 105 on the user device 110. As such, the location/event based merchant groups may be selected by the user 105 to check into the location or event.

Figure 3:
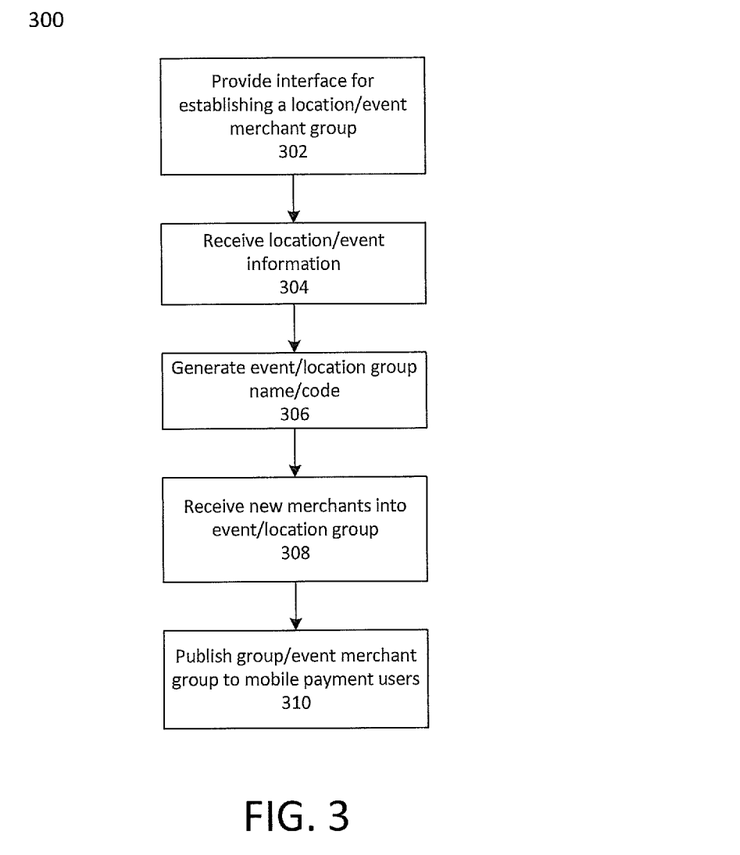
FIG. 3 is a flowchart showing a process for establishing a location/event for related merchants according to one embodiment.

FIG. 3 is a flowchart showing a process 300 for establishing a location/event for related merchants according to one embodiment. At step 302, an interface may be provided for establishing a location/event merchant group. In an embodiment, the interface may be provided via the mobile payment app at the user device 110 of the user 105. In another embodiment, the interface may be provided via a merchant app at the merchant device 140 of the merchant. The interface may be provided by connecting to an API of the payment provider server 170. The interface may allow a user or a merchant to input information for setting up a location or event based merchant group. In some embodiments, a location or an event may include several different merchant groups.

At step 304, the payment provider server 170 may receive location/event information for establishing the location/event based merchant groups from the event/location administrator. In particular, the payment provider server 170 may receive information for setting up the location/event based merchant groups from the user device 110 or the merchant device 140. The information may include the name/identification of the location/event, the location, time period, date, type of event/location, type of services/products offered, description, and the like. The location may be an area which may be defined by the event/location administrator by drawing on a virtual map of the administrator's device. For example, the location/event may be for a farmer's market at a town square on Saturday mornings. The name of the event may be "Springfield Farmer's Market." The location of the event may be defined by an area of the town square based on GPS coordinates. The time period of the event may be 7:00 AM to 1:00 PM on Saturdays, which may be a weekly recurring event. The type of products/services may include food, produce, games, arts and crafts, and the like. A general description may include "Event/Location check-in for merchants at Springfield Farmer's Market on Saturday mornings."

The event/location administrator may also set up security or privacy settings for the location/event. In an embodiment, the event/location administrator may restrict the location/event only to merchants who are invited by the administrator. For example, a password or passphrase may be required from a merchant in order to join a merchant group. In some embodiments, the event/location may be discoverable only by a certain group of users. As such, non-authorized users may not see or discover the location/group. A password or passcode may be needed for a user to check into a restricted merchant group. The event/location administrator may adjust the merchant group's security/privacy settings, such that the event/location may be public to all or restricted to certain merchants/users.

At step 306, the payment provider server 170 may generate event/location name/code for the merchant group. In particular, a unique identification (numeral/character) may be generated by the event/location based merchant group. Further, if the event/location based merchant group is restricted or private, a passcode or password may be generated for the event/location based merchant group. The location/event administer may give the passcode/password to an invited merchant. The invited merchant may then use the passcode/password to join the restricted/private merchant group. For example, at a conference event, the conference administer may restrict the event merchant group to only vendors/merchants who have formally registered with the conference administer. Thus, non-registered merchants/vendors may not join the conference merchant group without first registering with the conference administer. This allows the conference administer to better manage the plurality of different merchants/vendors who are attending the conference.

At step 308, the payment provider server 170 may receive new merchants into event/location group. For example, when a merchant wishes to join a merchant group, the merchant may use a merchant app installed at the merchant device 140 to find/search for merchant groups associated with a location or an event. The merchant device 140 may be connected to a merchant app API at the payment provider server 170 and the payment provider server 170 may search the merchant group database to find merchant groups related to the location/event requested by the merchant. The merchant may then select the merchant group or merchant groups the merchant wishes to join at the merchant app. If the selected merchant group is restricted and requires a passcode/password, the merchant app may request that the merchant enter a passcode/password. The payment provider server 170 may verify the passcode/password and may add the merchant into the merchant group if the passcode/password is verified.

At step 310, the payment provider server 170 may publish the group/event merchant group to mobile payment users. After the merchant is added to the merchant group, the merchant may be published or discoverable with the merchant group to users/customers. When a user/customer checks into the merchant group, the user/customer checks in with the merchant as well. In an embodiment, a merchant may be included in multiple merchant groups simultaneously. As such, the merchant may be checked in by a user when any one of the multiple merchants is checked in by the user.

In an embodiment, an event or location administrator may establish a location/event based merchant group. In some embodiments, a merchant may be an administrator setting up a merchant group for nearby merchants. For example, at an informal merchant gathering event, such as a food truck gathering along a street, one of the food truck merchants may decide to serve as an event/location administrator to set up an event/location merchant group for the informal food truck gathering and may invite the other food trucks to join the merchant group. Thus, the system may allow ad hoc set up of merchant group in real time for such spontaneous or informal merchant gatherings. The merchant group may be temporary and may expire after the gathering ends. Therefore, users/customers may have an event to check in for making mobile transactions even when the event is spontaneous or temporary.

In an embodiment, the user 105 may establish a personal merchant group. For example, the user 105 may select a group of favorite merchants at a mall and may include these favorite merchants in the user 105's personal merchant group at the mall location. The user 105 may select favorite merchants or frequently visited merchants Thus, when the user 105 arrives at the mall, the user 105 may quickly check in with the user 105's personal merchant group to conduct payments with the favorite merchants, without having to find them from a long list of merchants at the mall or to check in with individual favorite merchants. The user 105 may publish, post, and/or share the user 105's personal merchant group with other users. For example, the user 105 may share his/her personal merchant group with other users of a social networking site. The other users who have similar taste or interest in merchants/products/services may decide to use or check in with the user 105's personal merchant group. The user 105 may set the share/privacy settings of the user 105's personal merchant group accordingly, such as public: allowing the personal merchant group to be share with all or private: sharing with family/friends only.

In an embodiment, the payment provider server 170 may determine a merchant group based on location and transaction history of merchants and/or users. In particular, the payment provider server 170 may analyze location history and transaction history of merchants and may suggest a location/event based merchant group to merchants or users. For example, the payment provider server 170 may analyze the transaction history and location history of a group of food truck merchants and determine that they have a common pattern of gathering and making sales at a particular location every work day during lunch time. Thus, the payment provider server 170 may automatically set up a location/event for that particular location for every week day during lunch time, such as when two or more merchants are detected at the location. The payment provider server 170 may automatically invite the group of food truck merchants to join the location/event based merchant group. The payment provider server 170 may generate a passcode/access code which may be used by the food truck merchants to access/join the merchant group.

The payment provider server 170 may continue to monitor the transaction data and location data of the food truck merchants and may continuously update the time/location/group members of the merchant group over time. For example, based on the payment transactions data between customers and the food truck merchants and the location data of the food truck merchants (as detected by location detection devices on merchants' devices), the payment provider server 170 may determine that the time and location of the merchant group has changed. Thus, the payment provider server 170 may update the time/location of the merchant group accordingly. The payment provider server 170 also may update the members in the merchant group continuously. For example, food truck merchants who no longer attend the gathering may be removed from the merchant group automatically by the payment provider server 170. New food truck merchants who start to attend the gathering may be added automatically to the merchant group by the payment provider server 170.

The payment provider server 170 may analyze a user's transaction data/history and location data/history and may suggest a merchant group for the user. For example, based on the user 105's payment transaction history, the payment provider server 170 may determine that the user 105 regularly shops at several merchants at a shopping plaza every Saturday morning. The payment provider server 170 may automatically create a personal merchant group for the user 105 including the merchants at the shopping plaza for Saturday mornings and may suggest the merchant group to the user 105. If the user 105 accepts, the payment provider server 170 may set up the personal merchant group for the user 105. As such, when the user 105 visits the shopping plaza on Saturday morning, the user 105 may check in at the personal merchant group the shopping plaza to quickly conduct mobile transactions with the merchants.

Accordingly, process 300 allows a location/event based merchant group to be created dynamically by users or merchants or automatically by the payment provider server 170. The location/merchant group may have security/privacy settings and may be joined/accessed by all or restricted to certain group of merchants. Thus, merchant groups may be established ad hoc in real time for informal, spontaneous, or temporary events or gatherings. Merchant groups also may be automatically determined based on the users/merchants location/transaction history and suggested to the merchants or users.

Figure 4:
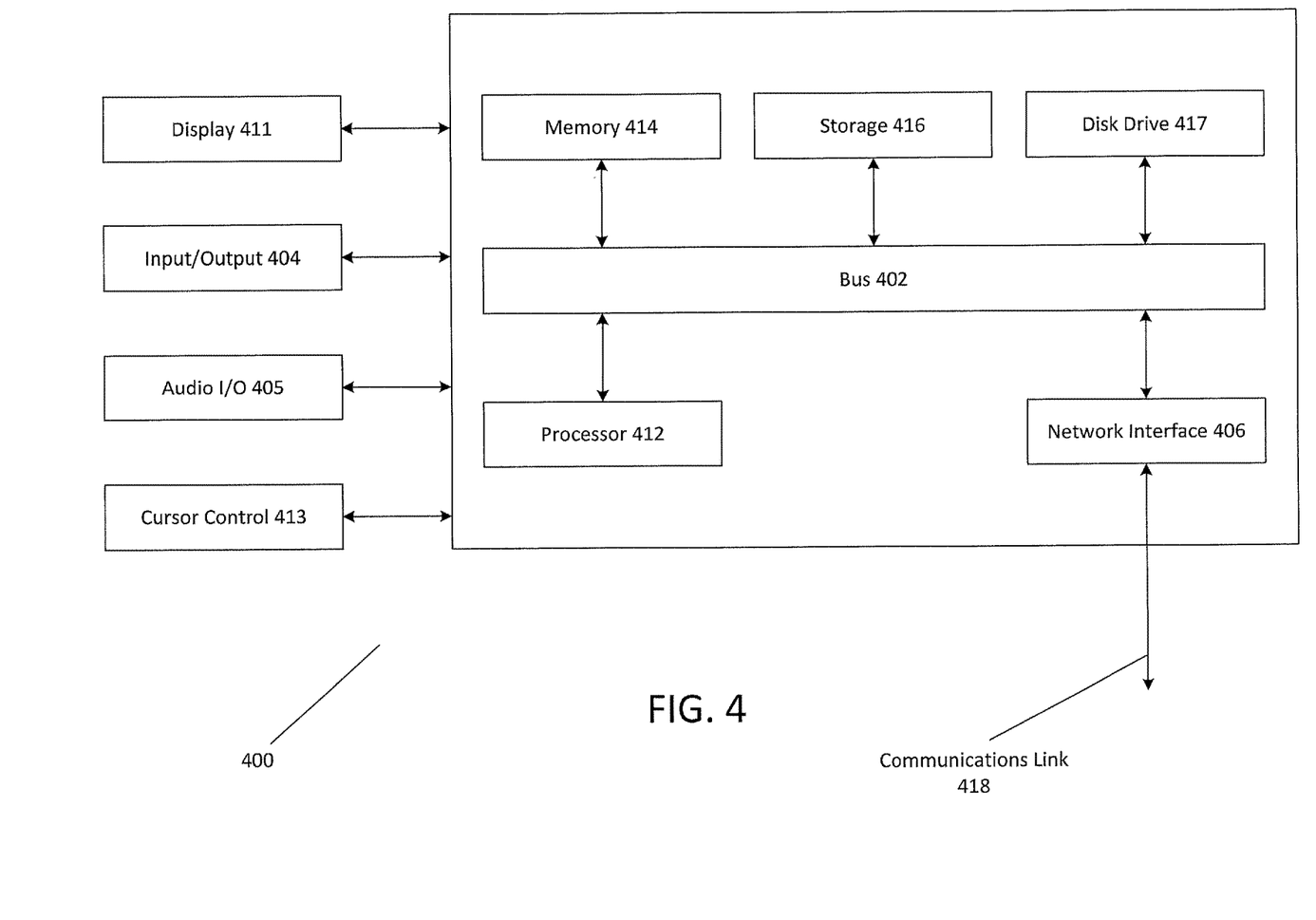
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant device, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system, comprising:
a non-transitory memory; and
one or more hardware processors coupled to the non-transitory memory and configured to read instructions from the non-transitory memory to cause the system to perform operations comprising:

determining an indication of an event based on transactions associated with a plurality of merchants within a geographical boundary;

accessing a merchant group for the event, wherein the merchant group is associated with the geographical boundary and comprises the plurality of merchants;

receiving, from a merchant device associated with a first merchant, a merchant group request;

determining that a location of the merchant device is within the geographical boundary;

in response to determining that the location of the merchant device is within the geographical boundary, adding the first merchant to the merchant group associated with the geographical boundary, wherein the adding the first merchant to the merchant group enables the first merchant to be discoverable by a mobile transaction device located within the geographical boundary; and providing, on the mobile transaction device, a user interface configured to allow a user of the mobile transaction device to conduct an electronic transaction with a merchant of the merchant group when the mobile transaction device is detected to be within the geographical boundary.

2. The system of claim 1, wherein the merchant group is associated with a stored passcode, and wherein the operations further comprise:

in response to determining that the location of the merchant device is within the geographical boundary, prompting, on the merchant device, for a passcode for joining the merchant group;

receiving, from the merchant device, the passcode from the first merchant; and determining that the passcode received from the first merchant corresponds to the stored passcode associated with the merchant group before adding the first merchant to the merchant group.

3. The system of claim 1, wherein the operations further comprise:

receiving, from the merchant device, a request for creating a second merchant group, wherein the request comprises information associated with the second merchant group comprising at least one of a name, a time, a location, or a description of the second merchant group; and establishing the second merchant group.

4. The system of claim 3, wherein the second merchant group is established temporarily for a gathering of merchants.

5. A method comprising:

determining, by one or more hardware processors, an indication of an event based on transactions associated with a plurality of merchants within a geographical boundary;

accessing a merchant group comprising at least the plurality of merchants for the event, wherein the merchant group is associated with the geographical boundary;

receiving, by the one or more hardware processors from a mobile transaction device, a request to view merchants for conducting mobile transactions;

determining, by the one or more hardware processors, that a location of the mobile transaction device is within the geographical boundary; and in response to determining that the location of the mobile transaction device is within the geographical boundary, providing, by the one or more hardware processors, an interface on the mobile transaction device that presents information of the merchant group associated with the geographical boundary and allows a user of the mobile transaction device to conduct a mobile transaction with a merchant of the merchant group.

6. The method of claim 5, further comprising:

receiving, from the mobile transaction device, a request to check in to the merchant group; and checking a user associated with the mobile transaction device in to the merchant group for conducting mobile transactions with one or more merchants in the merchant group.

7. The method of claim 5, further comprising:

receiving, from the mobile transaction device, a request to join the merchant group; and adding the user associated with the mobile transaction device to the merchant group, wherein the adding the user to the merchant group enables the user to be discoverable through the merchant group for conducting mobile transactions with customers.

8. The method of claim 7, further comprising:

determining that the merchant group is associated with a stored passcode;

receiving a passcode from the mobile transaction device provided by the merchant in association with the request; and determining that the passcode received from the mobile transaction device corresponds to the stored passcode prior to adding the merchant to the merchant group.

9. The method of claim 5, wherein the indication comprises a request for creating the merchant group received from a device, wherein the request comprises at least one of a name, a time, a location, or a description of the event.

10. The method of claim 5, further comprising creating a second merchant group for a customer, the second merchant group including merchants selected by the customer.

11. The method of claim 5, wherein the merchant group is created ad hoc for a meeting of the plurality of merchants.

12. The method of claim 5, wherein the plurality of merchants are automatically added to the merchant group based on analyzing the transactions associated with the plurality of merchants.

13. The method of claim 5, further comprising:

determining a transaction associated with a first merchant not included in the merchant group, wherein the transaction occurred within the geographical boundary; and in response to determining the transaction associated with the first merchant is not included in the merchant group, automatically updating the merchant group by adding the first merchant to the merchant group.

14. The method of claim 5, further comprising:

analyzing transaction history and location history of a user; and determining a personalized merchant group based on the transaction history and location history of the user.

15. A non-transitory machine-readable medium having stored thereon machine-readable instructions executable to cause a machine to perform operations comprising:

determining an indication of an event based on transactions associated with a plurality of merchants within a geographical boundary;

accessing a merchant group comprising at least the plurality of merchants for the event, wherein the merchant group is associated with the geographical boundary;

receiving a merchant group request from a merchant device associated with a first merchant;

determining that a location of the merchant device is within the geographical boundary;

in response to determining that the location of the merchant device is within the geographical boundary, adding the first merchant to the merchant group associated with the geographical boundary, wherein the adding the first merchant to the merchant group enables the first merchant to be discoverable by a mobile transaction device located within the geographical boundary; and providing, on the mobile transaction device, a user interface configured to allow a user of the mobile transaction device to conduct an electronic transaction with a merchant of the merchant group when the mobile transaction device is detected to be within the geographical boundary.

16. The non-transitory machine-readable medium of claim 15, wherein the operations further comprise:
determining that the merchant group is associated with a stored passcode;
receiving, from the merchant device, a passcode from the first merchant; and
determining that the passcode received from the first merchant user to the payment provider server to be verified by the payment provider server for corresponds to the stored passcode before adding the first merchant to the merchant group.

17. The non-transitory machine-readable medium of claim 15, wherein the indication comprises a request for creating the merchant group for the event, the request comprising at least one of a name, a time, a location, or a description of the event.

18. The non-transitory machine-readable medium of claim 15, wherein the operations further comprise creating the merchant group based on analyzing the transactions associated with a plurality of merchants within the geographical boundary.

19. The non-transitory machine-readable medium of claim 15, wherein the operations further comprise:
determining a transaction associated with a second merchant not included in the merchant group, wherein the transaction occurred within the geographical boundary; and
in response to the determining, automatically updating the merchant group by adding the second merchant to the merchant group.

20. The non-transitory machine-readable medium of claim 15, wherein the operations further comprise:
analyzing transaction history and location history of a user; and
adding the user to the merchant group based on the transaction history and location history of the user.

* * * * *